United States Patent [19]

Brandon

[11] 4,432,514

[45] Feb. 21, 1984

[54] DECOMPRESSION EQUALIZATION RELIEF VALVE

[75] Inventor: Dorris R. Brandon, Federal Way, Wash.

[73] Assignee: The Boeing Company, Seattle, Wash.

[21] Appl. No.: 725,809

[22] Filed: Sep. 23, 1976

[51] Int. Cl.³ .................. B64D 25/00; B64D 45/00
[52] U.S. Cl. ......................... 244/118.5; 98/1.5; 98/119; 137/513.3; 244/117 R; 244/121; 244/129.1
[58] Field of Search .............. 244/118.1, 117 R, 119, 244/121, 129.1, 118.5; 98/1.5; 52/1, 98–100; 49/21, 31, 141; 137/513.3, 473, 527; 99/119, 95, 2.18, 74, 77, 79

[56] References Cited

U.S. PATENT DOCUMENTS

| 789,627 | 5/1905 | Pullman | 98/74 |
|---|---|---|---|
| 1,081,195 | 12/1913 | Austin | 98/95 |
| 2,194,878 | 3/1940 | Tracy | 98/119 |
| 2,679,467 | 5/1954 | Sherts | 244/121 |
| 2,925,050 | 2/1960 | Candlin, Jr. et al. | 244/119 |
| 3,012,572 | 12/1961 | Bargetzi, Jr. et al. | 137/473 |
| 3,057,288 | 10/1962 | Papsdorf | 98/119 |
| 3,938,764 | 2/1976 | McIntyre et al. | 244/117 R |
| 4,033,247 | 7/1977 | Murphy | 244/129.1 |
| 4,133,852 | 1/1979 | DiNicolantonio et al. | 137/513.3 |

FOREIGN PATENT DOCUMENTS 2306877 11/1976 France .......................... 244/118.5

*Primary Examiner*—Galen L. Barefoot
*Attorney, Agent, or Firm*—Morris A. Case; B. A. Donahue

[57] ABSTRACT

A pressure relief device extends between the double side walls of a passenger compartment of an airplane to communicate with an adjacent cargo compartment. A duct is formed between a perforated section of an inside wall and a panel extending from the inside to the outside wall. A spring closing, pivotally mounted valve extends across to close off the duct and has perforations to permit air flow through the closed valve at low pressure differential between the compartments, but the valve will open at sudden high differential pressures.

9 Claims, 2 Drawing Figures

DECOMPRESSION EQUALIZATION RELIEF VALVE

BACKGROUND OF THE INVENTION

Aircraft are pressurized to maintain an atmosphere suitable for the comfort and safety of occupants at all levels of flight. When a pressurized airplane is flying at a high altitude, the pressure outside the airplane is considerably lower than inside. Should a cargo compartment experience a sudden decompression while at a high altitude it would set up a sudden pressure differential between the passenger and cargo compartments. The floor of the passenger compartment could be designed to withstand the sudden pressure differential or means could be provided to suddenly equalize the pressure in the two compartments. It is known to use a series of lower sidewall blow out panels held in place with an off-center hinge that pivots to move the panel aside in response to a sudden pressure differential. In U.S. Pat. No. 3,012,572 to Bargetzi et al, a relief valve is mounted to a wall of an equipment housing located in an airplane to allow decompression of the housing if the cabin of the airplane is breached. It was found that a series of sidewall decompression units will allow communication between a passenger and cargo compartment under normal operating conditions while quickly opening to allow decompression in response to a sudden pressure differential.

SUMMARY OF THE INVENTION

A pressure relief device extends between body frames of an airplane. The device has a perforated permeable member or section to replace a section of an inner sidewall of a passenger cabin. A duct is formed behind the perforated section with ductwork or a panel extending from the top of the perforated section to an outside wall. The duct which leads from the passenger cabin or compartment into the cargo compartment is blocked off with a pivotally mounted valve. The valve is perforated in a manner to permit flow of air to equalize pressure between the two compartments in response to a low pressure differential, but to open the spring-held closed valve in response to a sudden pressure differential.

DETAILED DESCRIPTION

Figure 1:
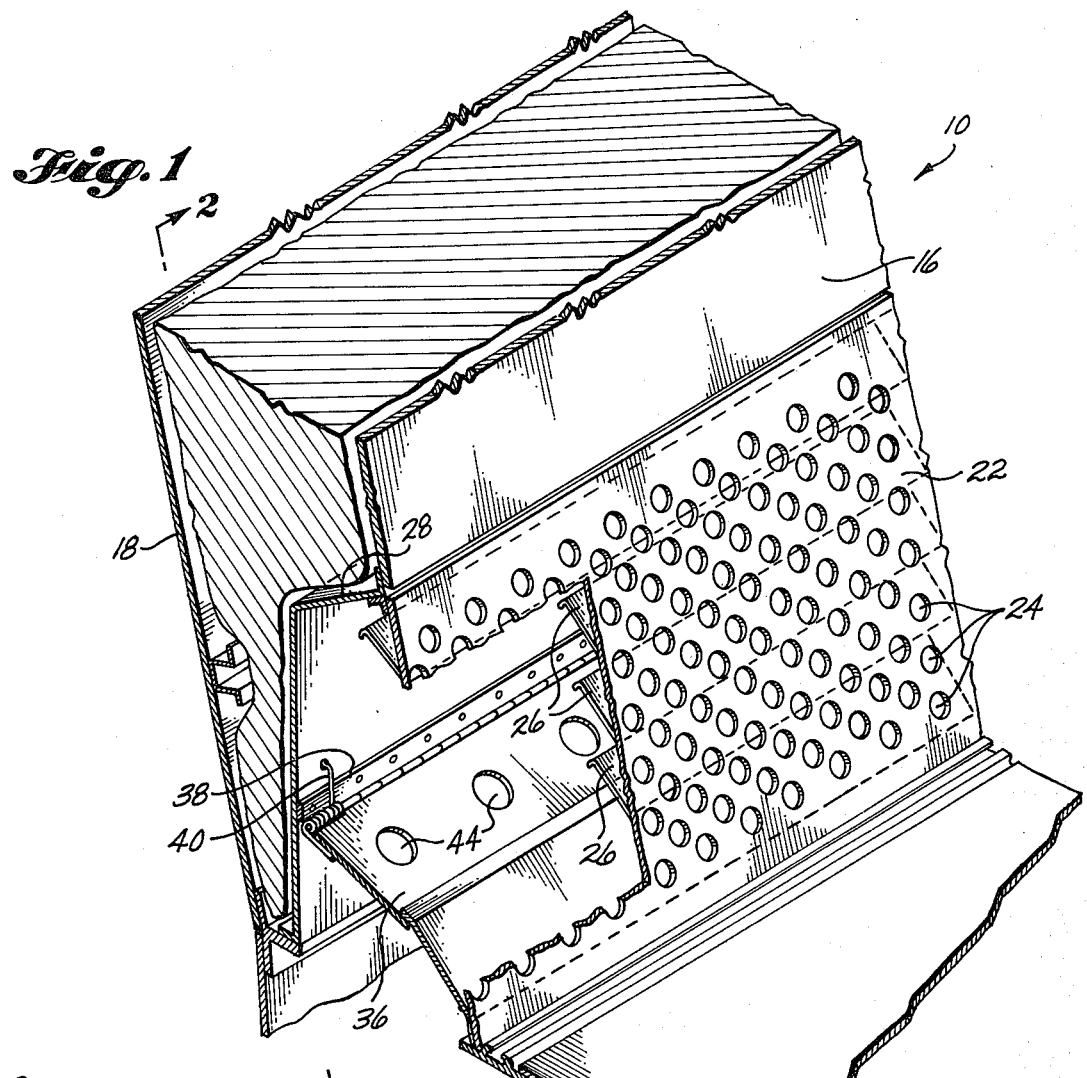
FIG. 1 shows a fragmented perspective view of the device of this invention.
Figure 2:
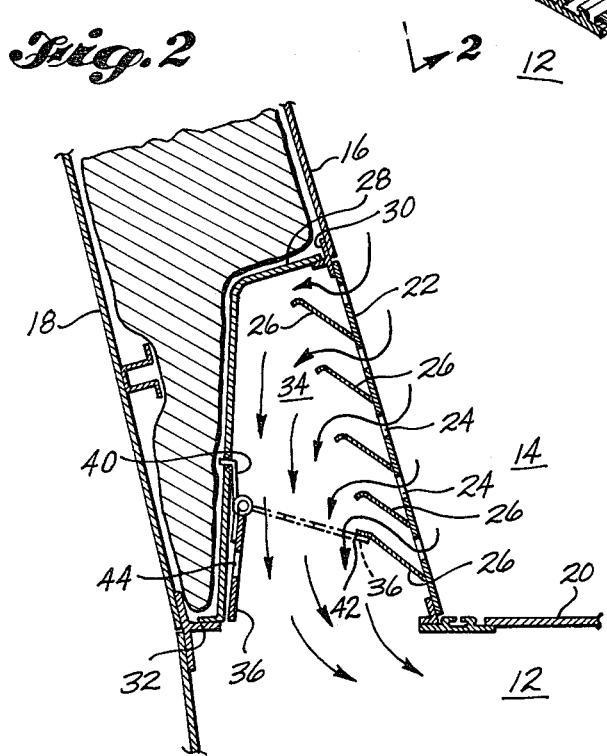
FIG. 2 shows a fragmented side elevational sectional view taken along line 2—2 of FIG. 1.

A pressure relief device 10 is mounted in an airplane having a cargo compartment 12, passenger compartment 14, an interior or inside wall 16, an outside wall or shell 18 and a floor panel 20. A section of the inside wall is replaced with a grill member 22 which in this embodiment has a series of perforations or holes 24. A series of fins 26 make up a louver which extends upward from the back side of the grill or perforated member. A panel 28 extends from a T-member 30 located at the top of the grill or perforated member 22 to a T-member 32 located on the outer wall 18. This forms a channel or duct 34 behind the perforated member which communicates between the two compartments. A valve 36 is mounted to a hinge 38 which in turn is mounted to the panel 28 to give a pivotally mounted valve which extends across to close off the channel. A torsion spring 40 is mounted to keep the valve closed under all normal operating conditions. In this embodiment the spring urges the valve to seat on the underside 42 of the lowest of the fins. A series of perforations 44 through the valve permit movement of air through the closed valve to equalize a low pressure differential between the two compartments. The holes are sized so as not to pass sufficient air when the pressure differential is large as would be the case if the cargo compartment should suddenly become depressurized. With a large pressure differential the valve would open to permit free flow of air through the duct.

Under normal operating conditions, the passenger compartment 14 and the cargo compartment 12 would be operating at essentially the same pressure and any minor variations in pressure would be equalized through the holes 44 in the closed valve 36. Should the cargo compartment experience a sudden decompression the pressure in the passenger compartment would act against the valve to quickly open the valve to permit free flow of air into the cargo compartment.

I claim:

1. A pressure relief device in an airplane to provide decompression relief between a passenger compartment having a double side wall and a cargo compartment, the device comprising: a grill to replace a section of an inside wall; ductwork to extend from an upper edge of the grill to an outer wall to form a channel for movement of air between the two compartments; and a pivotally mounted valve to extend across to block the channel, said valve having resilient means sized for holding the valve closed under normal operating conditions and having perforations sized to allow pressure equalization across the closed valve in response to a low pressure differential and to require the valve to open in response to a high pressure differential.

2. A pressure relief device as in claim 1 further comprising louvers to extend upward and outward from a back side of the grill.

3. A pressure relief device as in claim 1 further comprising: the valve pivot axis located adjacent the ductwork, and the resilient means is a spring.

4. A pressure relief device extending between adjacent frames of an airplane structure having a double wall passenger compartment and a cargo compartment, the device comprising: a porous section of an interior wall of the passenger compartment, a panel to extend from a top of the porous section to an outer wall to form a duct leading to the cargo compartment, a pivotally mounted valve to extend across to close the duct, a spring to hold the valve closed in normal operation, and means for permitting air flow through the valve at low pressure differential between the two compartments but to permit opening the valve in response to a sudden high pressure differential.

5. A pressure relief device as in claim 4 wherein the means for permitting air flow through the valve comprises having perforations through the valve.

6. A pressure relief device as in claim 4 further comprising louvers to extend upward from the duct side of the porous section.

7. A pressure relief device in an airplane to provide decompression relief between a passenger compartment having a double side wall and a cargo compartment comprising: a perforated member to replace a section of an inside wall of the passenger compartment, a panel to extend from a top of the perforated member to an outer wall to form a duct behind the perforated member leading to the cargo compartment, a valve pivotally mounted adjacent the panel to extend across to close off the duct, a spring to hold the valve in the closed position, and the valve having perforations sized to permit air flow between the two compartments through the closed valve in response to a low rate of differential pressure but not to prevent the valve opening in response to a sudden high pressure differential.

8. A pressure relief device as in claim 7 further comprising: a series of fins extending upward from a duct side of the perforated member to form a louver, and the valve located to seat on the underside of the lowest of the fins.

9. A method of providing side wall decompression relief between a passenger compartment and a cargo compartment of an airplane, the steps comprising: replacing a lower sidewall section of an inside wall of the passenger compartment with a perforated member, forming a duct behind the perforated member by extending a panel from the top of the perforated member to an outside wall, and closing off the duct with a spring closing pivotally mounted valve having perforations through the valve for permitting breathing through the valve under normal operating conditions and opening of the valve in response to a sudden pressure drop in the cargo compartment.

* * * * *